US006697651B2

(12) United States Patent
Li

(10) Patent No.: US 6,697,651 B2
(45) Date of Patent: Feb. 24, 2004

(54) COMMUNICATION SYSTEM HAVING IMPLEMENTED POINT-TO-MULTIPOINT-MULTICAST FUNCTION

(75) Inventor: Zhu Li, Beiging (CN)

(73) Assignee: Nokia Corporation, Espoo (FI)

( * ) Notice: Subject to any disclaimer, the term of this patent is extended or adjusted under 35 U.S.C. 154(b) by 58 days.

(21) Appl. No.: 09/982,176

(22) Filed: Oct. 19, 2001

(65) Prior Publication Data

US 2002/0077087 A1 Jun. 20, 2002

(30) Foreign Application Priority Data

Dec. 8, 2000 (EP) ............................................. 00126969

(51) Int. Cl.[7] .............................. H04B 1/38; H04M 1/00
(52) U.S. Cl. ........................ 455/574; 455/343; 455/458; 340/7.34; 370/311
(58) Field of Search ................................. 455/412, 414, 455/458, 558, 466, 572, 573, 574, 343; 340/7.32, 7.33, 7.34, 7.35, 7.45, 7.46; 370/311, 312, 320, 335

(56) References Cited

U.S. PATENT DOCUMENTS

| 6,072,987 A | * | 6/2000 | Willey ......................... 370/311 |
| 6,112,055 A | * | 8/2000 | Bennett et al. ............. 340/7.34 |
| 6,421,540 B1 | * | 7/2002 | Gilhousen et al. ........... 455/458 |

FOREIGN PATENT DOCUMENTS

| WO | 9825422 | 6/1998 | ............ H04Q/7/28 |
| WO | 9957927 | 11/1999 | ............ H04Q/7/22 |
| WO | 0052948 | 9/2000 | ............ H04Q/7/38 |
| WO | 0103460 | 7/2001 | ............ H04Q/7/38 |

OTHER PUBLICATIONS

"Universal Mobile Telecommunications System (UMTS); Physical Channels and Mapping of Transport Channels onto Physical Channels (FDD) (3GPP TS 25.211 Version 3.4.0 Release 1999)" ETSI TS 125 211 V3.4.0 )2000–09) Technical Specification, Sep. 2000, pp. 1–42, XP002168076, Sophia Antipolis, France.

* cited by examiner

Primary Examiner—Quochien Vuong
(74) Attorney, Agent, or Firm—Antonelli, Terry, Stout & Kraus, LLP

(57) ABSTRACT

The present invention relates to a communication system having a network (1) and a plurality of user terminals (2,3,4) that are coupled to the network via a communication channel using wireless radio frequency transmission and having a downlink channel for transmitting messages in the direction from the network to the user terminals. The downlink channel comprises a paging channel for transmission of paging messages in paging frames for initiating communication with a user terminal allocated to a paging group of a plurality of user terminals. A paging indicator channel transmitter of a paging indicator belonging to the paging group when there is a paging message for the user terminal belonging to the paging group. The user terminal processes a next paging frame transmitted on the paging channel to determine whether there is a paging message intended for the user terminal when the paging indicator has been transmitted on the paging indicator channel. The paging message on the paging channel comprises a point-to-multipoint-multicast (PTM-M) group identifier to identify a PTM-M group.

46 Claims, 2 Drawing Sheets

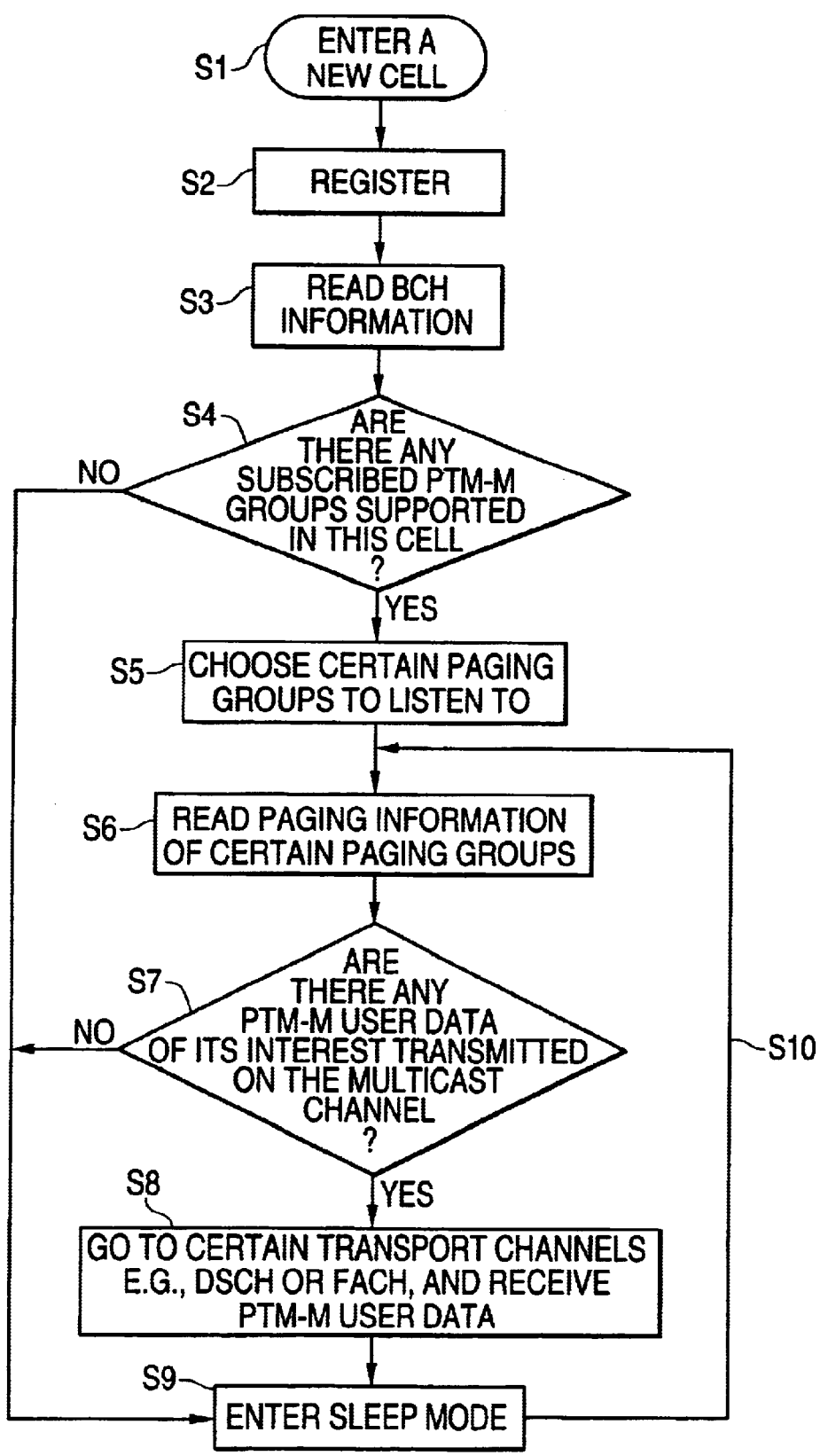

COMMUNICATION SYSTEM HAVING IMPLEMENTED POINT-TO-MULTIPOINT-MULTICAST FUNCTION

BACKGROUND OF THE INVENTION

1. Field of the Invention

The present invention refers to a communication system comprising a network and a plurality of user terminals that are coupled to the network via a communication channel using wireless radio frequency transmission and having a downlink channel for transmitting messages in the direction from the network to the user terminals. Further, the invention relates to a network and a user terminal, both for use in said communication system.

2. Description of the Prior Art

Recently, mobile telephone communication networks and systems have become very popular, for example, the telephone network corresponding to the Global Mobile Satellite (GMS) standards. The GMS systems supports the usual mobile telephone communication and, in addition, a number of further services, e.g. the short message service (SMS) cell broadcast and the point to multipoint multicast (PTM-M) service in the general packet radio system.

The PTM-M service is a service in which the message is transmitted to all subscribers currently located within a geographical area. The message contains a group identifier indicating whether the message is of interest to all subscribers or to only a subset of subscribers or user terminals, e.g. certain mobile telephones also called mobile stations belonging to a specific PTM group. The PTM-M service is a connectless unidirectional service, i.e. in the downlink direction from the network to the user terminal, and is a variable bit rate service.

SUMMARY OF THE INVENTION

The object of the present invention is the implementation of the PTM-M service in communication systems, e.g. the Universal Mobile Telecommunication System (UMTS), of the latest generation.

The communication system of the invention comprises a network and a plurality of user terminals that are coupled to the network via a communication channel using wireless radio frequency transmission and having a downlink channel for transmitting messages in the direction from the network to the user terminals, wherein the downlink channel comprises:

a paging channel for transmission of paging messages in paging frames for initiating communication with a user terminal allocated to a paging group of a plurality of user terminals, and a paging indicator channel for transmission of a paging indicator belonging to the paging group when there is a paging message for the user terminal belonging to the paging group, wherein the user terminal processes the next paging frame transmitted on the paging channel to determine whether there is a paging message intended for the user terminal when the paging indicator has been transmitted on the paging indicator channel, and wherein the paging message on the paging channel comprises a point-to-multipoint-multicast (PTM-M) group identifier to identify a PTM-M group.

A considerable advantage of the present invention is the implementation of the PTM-M service in the communication system, for instance, the UMTS without the requirement of additional channels or downlink transport channels. This is achieved by using a paging channel, a paging indicator channel and a downlink transport channel already provided by the communication system. These channels are destinated to implement the PTM-M service in the communication system. Thereby a substantial increase of the system complexity in the e.g. UMTS is avoided when the PTM-M service is implemented.

Preferably, the paging channel itself is used to transport the PTM-M messages, wherein the paging message on the paging channel comprises one or a plurality of PTM-M messages intended for the PTM-M group identified by means of the PTM-M group identifier. The paging channel may be the secondary common control physical channel (S-CCPCH) of the UMTS.

In an alternative embodiment, the downlink channel may comprise in addition a downlink transport channel shared by several user terminals and allocated for transporting PTM-M messages, wherein the user terminal accesses the PTM-M messages of the downlink transport channel when, in the paging channel, the user terminal has detected a PTM-M identifier of a PTM-M group to which the user terminal is allocated.

In an preferred embodiment, the communication system is the UMTS and the downlink transport channel for PTM-M messages is the known forward access channel (FACH) or the downlink shared channel (DSCH) of the UMTS.

The PTM-M identifiers or the plurality of PTM-M identifiers allocated to a user terminal may be stored in a data memory of the user terminal. This allows a quick decision in the user terminal or the mobile telephone whether a detected PTM-M identifier on the paging channel is of interest to the user terminal or not. This helps to save battery power of the mobile phone as the phone is enabled to re-enter quickly into sleep mode or idle mode in which a low power consumption is attained.

In an preferred embodiment, the PTM-M group identifier is the international mobile group identifier used in the general packet radio system (GPRS).

The method of the invention comprises the following steps:

in a paging channel of the downlink channel, transmitting of paging messages in paging frames for initiating communication with a user terminal allocated to a paging group of a plurality of user terminals, in a paging indicator channel of the downlink channel, transmitting of a paging indicator allocated to the paging group when there is a paging message for the user terminal belonging to the paging group, processing the next paging frame transmitted on the paging channel by the user terminal to see, whether there is a paging message intended for the user terminal when the paging indicator has been transmitted on the paging indicator channel, and, in the paging message of the paging channel, transmitting at least one point-to-multipoint-multicast (PTM-M) group identifier to identify a PTM-M group by the network.

Preferably the method of the invention comprises allocating an area to a cell or to a plurality of cells in the network wherein the user terminal is in the area, and providing the paging indicator channel and the paging channel comprising the PTM-M identifier or plurality of PTM-M identifiers to the cell or to the plurality of cells of the area.

The method may comprise, in an area serviced by the network and divided into a plurality of cells, entering one of said cells by the mobile user terminal and registering of the user terminal to be in said cell by the network of the communication system, providing of PTM-M identifiers on a downlink transport channel of the downlink channel, the information indicating the PTM-M groups supported in said cell by the network, reading the PTM-M identifiers on the downlink transport channel by the user terminal, and comparing the PTM-M identifiers read from the downlink transport channel with PTM-M identifiers being stored in a memory of the user terminal and indicating the PTM-M groups to which the user terminal subscribes in order to determine the PTM-M groups serviced in the cell for said user terminal. These steps effectively support sleep-mode operation of the user terminal or mobile phone in connection with the implementation of the PTM-M service, i.e. an effective way for saving power of the mobile phone.

The invention according to yet another aspect also relates to a network. The above preferred embodiments of the communication system also apply to the network.

Furthermore, the invention relates to a user terminal, e.g., a mobile station, especially for use in a communication system. The above preferred embodiments of the communication system also apply to the user terminal.

BRIEF DESCRIPTION OF THE DRAWINGS

Further advantages, advantageous embodiments and additional applications of the invention are provided in the following description of a preferred embodiment of the invention in connection with the figures being enclosed which show:

FIG. 3 is a schematic flow chart showing the substantial steps of the invention if a user terminal starts from sleep-mode.

DESCRIPTION OF THE PREFERRED
EMBODIMENTS OF THE INVENTION

Figure 1:
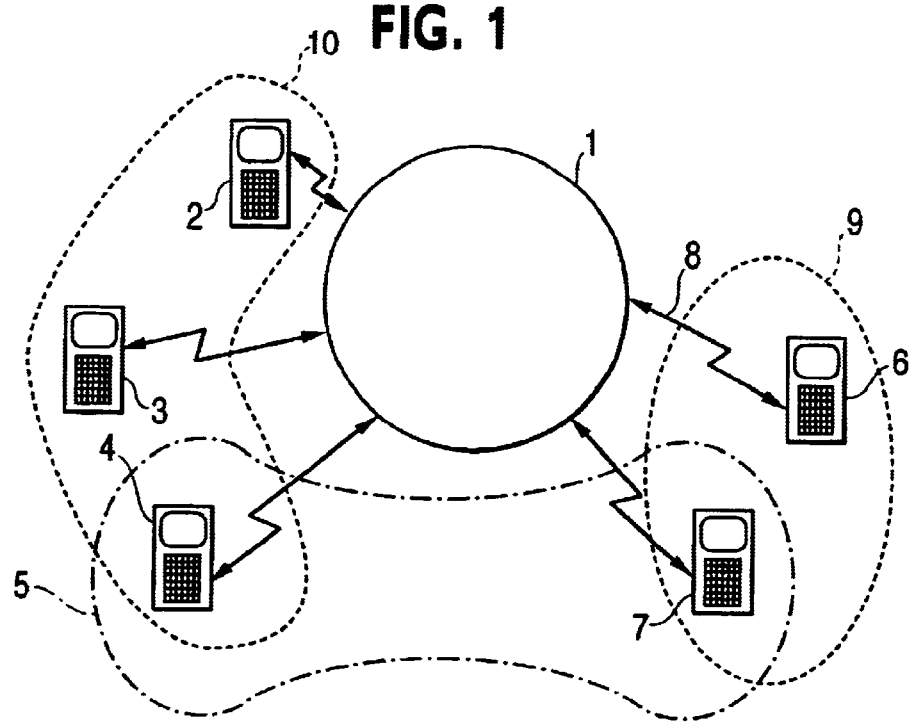
FIG. 1 is a schematic view of a communication system according to a preferred embodiment of the invention.

FIG. 1 shows schematically the basic structure of a communication system according to a preferred embodiment of the invention. The communication system is a UMTS system of the latest generation which is called a 3GPP WCDMA system and which comprises a UMTS terrestrial radio access network (UTRAN) 1 as network and a plurality of terminal users 2, 3, 4, 6, 7 or mobile stations, e.g. mobile phones according to the UMTS standard, which are coupled to the UTRAN 1 via a communication channel using wireless radio frequency transmission of payload and control information or messages and having a downlink channel 8 being directed from the UTRAN 1 to the plurality of terminal users 1, 2, 3, 4, 6 to 7. A detailed explanation of the downlink channel 8 used in the shown UMTS is described, for instance, in the technical specification 3GPP TS 25.211 V3.4.0 (2000-09) "3rd Generation Partnership Project; Technical Specification Group Radio Access Network; Physical channels and mapping of transport channels onto physical channels (FDD) (Release 1999)" issued by the 3GPP Organizational Partners, which specification is incorporated herein by reference in its entirety.

As shown in FIG. 1, the user terminals 2, 3 and 4 are in the same cell 10, whereas the user terminals 6 and 7 are in a further cell 9. Each of the cells 9, 10 cover a different area or are located within the same geographical area. The user terminals 4 and 7 belong to the same PTM-M-group 5 to which a special PTM-M group identifier or corresponding control data are allocated. The PTM-M group identifier may be the known international mobile group identifier (IMGI) of the known general packet radio system (GPRS). PTM-M identifiers and corresponding IMGIs are used to implement the PTM-M service in the UMTS.

Figure 2:
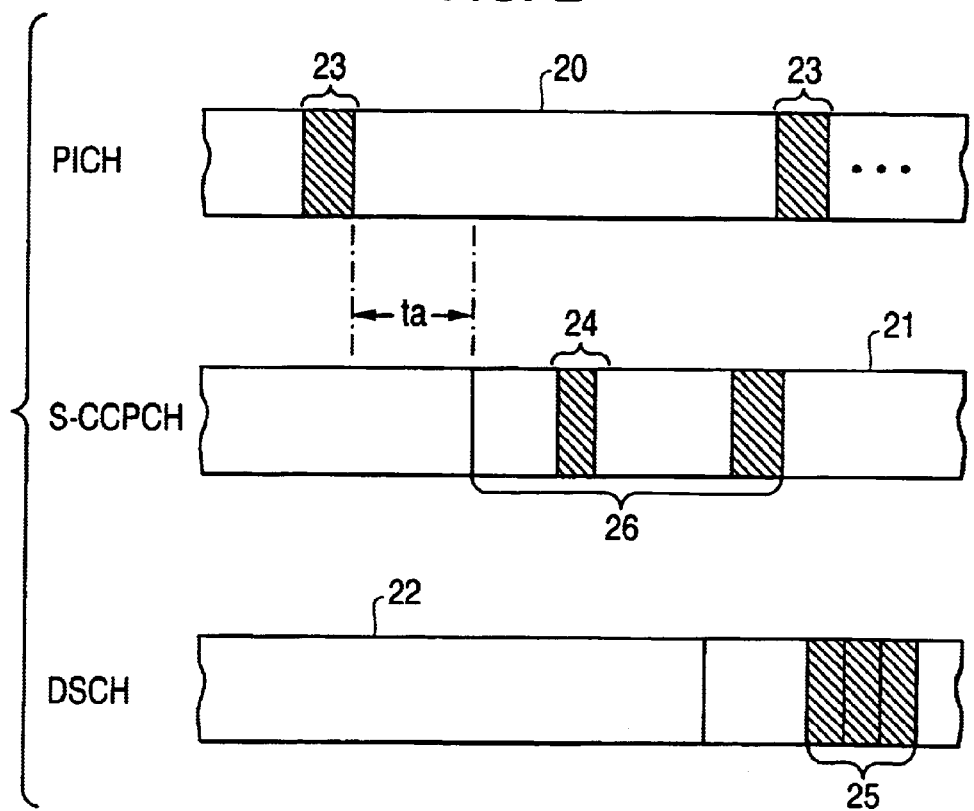
FIG. 2 is a schematic timing diagram showing three different downlink transport channels of the communication system of FIG. 1 in order to explain the method of the invention in connection with FIG. 3.

The downlink channel 8 of the UMTS comprise, as illustrated in FIG. 2, inter alia, a paging indicator channel (PICH) 20, a paging channel 21, e.g. the secondary common control paging channel (S-CCPCH), and a further downlink transport channel 22, e.g. the downlink shared channel (DSCH) or the forward access channel (FACH).

In general, the paging channel 21 is a downlink transport channel that carries data relevant to the paging procedure, that is, when the network or UTRAN 1 wants to initiate communication with one of the plurality of user terminals. The simplest example is a speech call to the user terminal. The UTRAN 1 transmits a paging message to the user terminal on the paging channel of those cells belonging to the location area in which the user terminal is expected to be. The identical paging message can be transmitted in a single cell or in up to a few hundreds of cells depending on the configuration of the UTMS.

The paging channel 21 is operated together with the paging indicator channel 20 to provide the user terminals with an effective sleep mode operation. The paging indicator channel 20 transfers paging indicators 23 which appear periodically on the paging indicator channel 20 when there are paging messages for any of the user terminals belonging to a paging group which may comprise all user terminals of the cells 9 and 10 or only either the user terminals of the cell 9 or the user terminals of the cell 10.

As shown in FIG. 1, for instance, the user terminal 7 within cell 9 is a member of the paging group related to cell 9 and in addition also a member of a PTM-M group 5 corresponding to a PTM-M service and a special PTM-M group identifier 24 (see. FIG. 2). Further, the user terminal 4 in the cell 10 is a member of a further paging group related to cell 10 and in addition is also a member of the PTM-M group 5 corresponding to the PTM-M service and the PTM-M group identifier 24 (see FIG. 2).

The preferred embodiment of the method of the invention is described and explained in the following in relation to the FIGS. 2 and 3.

For instance, the user terminal 7 has just recently entered the cell 9 (see step S1 in FIG. 3) and registration of the user terminal 7 has been accomplished by the user terminal 7 and the UTRAN 1 (see step S2). The user terminal 7 subsequently reads the PTM-M group identifier information comprising also the PTM-M group identifier 24 on a BCH downlink channel which contains the information identifying which PTM-M groups are supported in the cell 9 (see step S3). The user terminal 7 compares (see step S4) the PTM-M group identifiers read from the BCH downlink channel with the stored PTM-M group identifiers, for instance, in a SIM card as a memory of the user terminal 7. In the present example, the user terminal 7 or its owner is only subscribing to the PTM-M group 5 identified by the PTM-M group identifier 24 and, therefore, only the PTM-M group identifier 24 is stored in its SIM card. The user terminal 7 in the next step S5, therefore, only selects the PTM-M group identified by the PTM-M identifier 24, when it should detect the PTM-M group identifier as paging message on the paging channel 21.

The user terminal 7, scans the paging indicator channel 20 in order to detect a paging indicator 23. If the paging indicator channel 20 does not transport a paging indicator 23, the user terminal 7 enters the sleep mode, this step not being shown in FIG. 3.

Hereinafter, the illustrated embodiment relates to the case when the UTRAN 1 wants to send a PTM-M message 25 of the PTM-M service to the user terminal 7. At first, the UTRAN 1 determines on the basis of the information stored during the registration step S2 the cell and/or the cells in which the user terminal 7 is expected to be. In the present example, shown in FIG. 1, the UTRAN 1 finds the user terminal 7 to be in the cell 9. The UTRAN 1, then, issues periodically the paging indicator 23 on the paging indicator channel 20 and further issues a paging frame 26 comprising the PTM-M group identifier 24 as a paging message on the paging channel 21, wherein the paging frame 26 has an offset value in time ta with regard to the paging indicator 23 on the paging indicator channel 20. In addition, the UTRAN 1 outputs a PTM-M message 25 on the additional downlink transporting channel 22, the PTM-M message belonging to the PTM-M service being active.

Starting from the idle mode or sleep mode S9, the user terminal 7 scans periodically the paging channel 20 in order to detect a paging indicator. The user terminal detects the paging indicator 23 issued from the UTRAN 1 (step S6). In the following, the user terminal 7 scans a next paging frame 26 on the paging channel 21 after the duration ta and detects the PTM-M group identifier 24 issued by the UTRAN 1 on the paging channel 21. The time ta between the end of the paging indicator 23 and the beginning of the next paging frame is typically 7680 chips.

Subsequently, the user terminal 7 compares the detected PTM-M group identifier 24 with the PTM-M group identifier stored in its SIM card (see step S7 of FIG. 3). Provided the detected PTM-M group identifier 24 is identical to the stored PTM-M group identifier, the user terminal determines that a PTM-M message or PTM-M user data is issued belonging to the PTM-M group 5 to which it subscribes. See "Yes" after step S7 in FIG. 3. If a "No" should result after step S7, there is no PTM-M message of a PTM-M group the user terminal 7 is subscribed to and the user terminal 7 returns into its sleep mode.

In the case of a "Yes" after step S7 the user terminal 7 scans the downlink transporting channel 22 (see step S8) in order to detect and to read the PTM-M message 25 issued by the UTRAN 1. After processing of the PTM-M message 25, the user terminal 7 returns into its sleep mode in step S9. The user terminal S9 repeats the steps S6, S7, S8, S9 and S10 periodically.

As shown in FIG. 1, also the user terminal 4 is a member of the PTM-M group 5 and, therefore, it subscribes to the corresponding PTM-M service. In order to provide the PTM-M service to the user terminal 4, the UTRAN 1 issues the paging indicator 23 on the paging indicator channel 20, the PTM-M group identifier 24 on the paging channel 21 and the PTM-M message 25 as described above with reference to the user terminal 7 and simultaneously transmits them to the user terminal 4 in the cell 10 in which the user terminal 4 is expected to be. The user terminal 4 carries out the same steps as described above with regard to the user terminal 7 in order to detect and read the PTM-M message 25.

In case of further user terminals (not shown in the figures) or a large number of user terminals belonging to the same PTM-M group, the paging indicators 23, the PTM-M group identifier 24 and the PTM-M message 25 are output simultaneously to all user terminals belonging to the same PTM-M group regardless of whether the user terminals are within one cell or within a large number of different cells.

What is claimed is:

1. A communication on system comprising a network and a plurality of user terminals that are coupled to the network via a communication channel using wireless radio frequency transmission and having a downlink channel for transmitting messages in the direction from the network to the user terminals, wherein the downlink channel comprises:
   a paging channel for transmission of paging messages in paging frames for initiating communication with a user terminal allocated to a paging group of a plurality of user terminals; and
   a paging indicator channel for transmission of a paging indicator belonging to said paging group, in case there is a paging message for the user terminal belonging to said paging group, wherein the user terminal processes a next paging frame transmitted on the paging channel to determine whether there is a paging message intended for the user when the paging indicator has been transmitted on the paging indicator channel; and wherein
   the paging message on the paging channel comprises a point-to-multipoint-multicast (PTM-M) group identifier to identify a PTM-M group.

2. A communication system according to claim 1, wherein:
   the paging message on the paging channel comprises one or a plurality of PTM-M messages intended for the PTM-M group and identified by means of the PTM-M group identifier.

3. A communication system according to claim 1, wherein:
   the downlink channel comprises in addition a downlink transport channel shared by user terminals and which transports PTM-M messages, wherein the user terminal accesses the PTM-M messages of the downlink transport channel when, in the paging channel, the user terminal has detected a PTM-M identifier of a PTM-M group to which the user terminal is allocated.

4. A communication system according to claim 3, wherein:
   the communication system is the UMTS and the downlink transport channel is the forward access channel (FACH) of the UMTS.

5. A communication system according to claim 3, wherein:
   the communication system is the UMTS and the downlink transport channel is the downlink shared channel (DSCH) of the UMTS.

6. A communication system according to claim 1, wherein:
   an area is allocated to at least one cell, wherein the user terminal is located in the area and the network transmitting the paging indicator channel and the paging channel comprising at least one PTM-M identifier to the at least one cell of the area.

7. A communication system according to claim 1, wherein:
   the at least one PTM-M identifier terminal is stored in a data memory of the user terminal.

8. A communication system according to claim 7, wherein:
   the data memory is a memory in a SIM card of the user terminal.

9. A communication system according to claim 1, wherein:
   the communication system is the Universal Mobile Telecommunication System (UMTS), wherein the network is the UMTS Terrestrial Radio Access network and wherein the user terminal is an UMTS terminal or an UMTS mobile phone.

10. A communication system according to claim 1, wherein:
the communication system is the UMTS and the paging channel is the secondary common control physical channel (S-CCPCH) of the UMTS.

11. A communication system according to claim 1, wherein:
the PTM-M group identifier is the international mobile group identifier used in the general packet radio system (GPRS).

12. A network, which communicates with a plurality of user terminals that are coupled to the network via a communication channel using radio frequency transmission and having a downlink channel for transmitting messages in a direction from the network to the user terminals, wherein the downlink channel comprises:
   a paging channel which transmits paging messages in paging frames for initiating communication with a user terminal allocated to a paging group of a plurality of user terminals; and
   a paging indicator channel which transmits a paging indicator belonging to staid paging group, in case there is a paging message for the user terminal belonging to the paging group; and wherein
   the paging message on the paging channel comprises a point-to-multipoint-multicast (PTM-M) group identifier to identify a PTM-M group.

13. A user terminal, which communicates with a network, comprising a mobile station including a receiver which receives messages from the network in a downlink channel; wherein said downlink channel comprises:
   a paging channel for reception of paging messages in paging frames or initiating communication with said network, the user terminal being allocated to a paging group comprising a plurality of user terminals; and
   a paging indicator channel for reception of a paging indicator belonging to said paging group, in case there is a paging message for the user terminal belonging to said paging group; and wherein
      the user terminal processes a next paging frame received on the paging channel to determine whether there is a paging message intended for the user when the paging indicator has been transmitted on the paging indicator channel and the paging message on the paging channel comprises a point-to-multipoint-multicast (PTM-M) group identifier to identify a PTM-M group.

14. A method in a communication system comprising a network and a plurality of user terminals that are coupled to the network via a communication channel using radio frequency transmission and having a downlink channel for transmitting messages in direction from the network to the user terminals, wherein the method comprises:
   in a paging channel of the downlink channel, transmitting paging messages in paging frames for initiating communication with a user terminal allocated to a paging group of a plurality of user terminals;
   in a paging indicator channel of the downlink channel, transmitting of a paging indicator allocated to the paging group, in case there is a paging message for the user terminal belonging to the paging group;
   processing of a next paging frame transmitted on the paging channel by the user terminal to determine whether there is a paging message intended for the user when the paging indicator has been transmitted on the paging indicator channel; and
   in the paging message of the paging channel, transmitting at least one point-to-multipoint-multicast (PTM-M) group identifier to identify a PTM-M group by the network.

15. A method according to claim 14, wherein:
the paging message or the paging channel comprises a PTM-M message being intended for the PTM-M group which is identified by the PTM-M group identifier.

16. A method according to claim 15, comprising:
in the downlink channel, providing a downlink transport channel shared by user terminals and which transports PTM-M messages, the user terminal accessing the PTM-M messages of the downlink transport channel when, in the paging channel, the user terminal has detected a PTM-M identifier of a PTM-M group to which the user terminal is allocated.

17. A method according to claim 14, comprising:
allocating an area to at least one cell by the network, wherein the user terminal is in the area, and provides the paging indicator channel and the paging channel comprises the at least one PTM-M group identifier or to the at least one cell of the area.

18. A method according to claim 14, comprising:
storing of the at least one PTM-M group identifier allocated to the user terminal in a data memory of the user terminal.

19. A method according to claim 14, comprising:
in an area serviced, by the network and divided into a plurality of cells, entering one of said cells by the mobile user terminal and registering of the user terminal to be in the one cell by the network of the communication system;
providing the PTM-M identifier on a downlink transport channel of the downlink channel, the information indicating the PTM-M group supported in the one cell by the network;
reading the at least one PTM-M group identifiers on the downlink transport channel by the user terminal; and
comparing the at least one PTM-M group identifier read from the downlink transport channel with the at least one PTM-M group identifier being stored in a memory of the user terminal and indicating the PTM-M group to which the user terminal subscribes in order to determine the PTM-M group serviced in the cell for the user terminal.

20. A method according to claim 14, comprising:
periodically detecting and reading the paging indicators on the paging indicator channel by the user terminal.

21. A method according to claim 20, comprising:
when a paging indicator is detected on the paging channel, reading the paging message on the paging channel which is allocated to the paging indicator.

22. A method according to claim 20, comprising:
when a PTM-M identifier is detected by the user terminal in the paging message on the paging channel, comparing the detected PTM-M group identifier to the at least one PTM-M group identifier stored in the user terminal.

23. A method according to claim 22, comprising:
when the detected PTM-M identifier corresponds to one of the at least one PTM-M group identifier stored in the user terminal, reading of PTM-M messages belonging to the PTM-M group identified by the PTM-M group identifier on a downlink transport channel of the downlink channel.

24. A method according to claim 20, wherein:
the user terminal is in a sleep-mode between steps of periodically detecting and reading of the paging indicators.

25. A communication system comprising a network and a plurality of user terminals that are coupled to the network via a communication channel using wireless radio frequency transmission and having a downlink channel for transmitting messages in the direction from the network to the user terminals, wherein the downlink channel comprises:
a paging channel for transmission of paging frames for initiating communication with a user terminal allocated to a paging group of a plurality of user terminals; and
a paging indicator channel for transmission of a paging indicator belonging to the paging group, when there is a paging message for a user terminal belongin to the paging group, wherein the user terminal processes the next paging frame transmitted on the paging channel to determine whether there is a paging message intended for the user when the paging indicator has been transmitted on the paging indicator channel; and wherein
the paging message on the paging channel comprises a point-to-multipoint-multicast (PTM-M) group identifier to identify a PTM-M group, and at least one, PTM-M identifier allocated to the user terminal is stored in a data memory of said user terminal.

26. A communication system according to claim 25, wherein the paging message on the paging channel comprises at least one PTM-M message intended for the PTM-M group and identified by means of the PTM-M group identifier.

27. A communication system according to claim 25, wherein the downlink channel comprises in addition a downlink transport channel shared by user terminals and which transports the PTM-M messages, wherein a user terminal accesses the PTM-M messages of the downlink transport channel when, in the paging channel, the user terminal has detected a PTM-M identifier of a PTM-M group to which the user terminal is allocated to.

28. A communication system according to claim 27, wherein the communication system is Universal Mobile Telecommunication System (UMTS) and the downlink transport channel is the forward access channel (FACH) of the UMTS.

29. A communication system according to claim 27, wherein the communication system is Universal Mobile Telecommunication System (UMTS) and the downlink transport channel is the downlink shared channel (DSCH) of the UMTS.

30. A communication system according to claim 25, wherein an area is allocated to at least one cell, wherein the user terminal is located in the area, the network transmitting the paging indicator channel and the paging channel comprising the at least one PTM-M identifier to the at least one cell of the area.

31. A communication system according to claim 25, wherein the data memory is a memory in a SIM card of the user terminal.

32. A communication system according to claim 25, wherein the communication system is the Universal Mobile Telecommunication System (UMTS), wherein the network is the UMTS Terrestrial Radio Access network and wherein the user terminal is an UMTS terminal or an UMTS mobile phone.

33. A communicatiion system according to claim 25, wherein the communication system is Universal Mobile Telecommunication System (UMTS) and the paging channel is the secondary common control physical channel (S-CCPCH) of the UMTS.

34. A communication system according to claim 25, wherein the PTM-M group identifier is the international mobile group identifier used in the general packet radio system (GPRS).

35. A Universal Mobile Telecommunication System (UMTS) network, which communicates with a plurality of user terminals that are coupled to the network via a communication channel using wireless radio frequency transmission and having a downlink channel for transmitting messages in the direction from the network to the user terminals, wherein the downlink channel comprises:
a paging channel for transmission of paging messages in paging frames for initiating communication with a user terminal allocated to a paging group of a plurality of user terminals:
a paging indicator channel for transmission of a paging indicator belonging to the paging group, when there is a paging message for a user terminal belonging to the paging group; and wherein
the paging message on the paging channel comprises a point-to-multipoint-multicast (PTM) group identifier a PTM-M group, and the paging channel is the secondary common control physical channel (S-ccpch) of the UTMS.

36. A user terminal, which communicates with a network having a mobile station, including reception means which receives messages from the networl in a downlink channel; wherein the downlink channel comprises:
a paging channel for reception of paging messages in paging frames for initiating communication with the network, the user terminal being allocated to a paging group comprising a plurality of user terminals; and
a paging indicator channel for reception of a paging indicator belonging to the paging group, when there is a paging message for the user terminal belonging to the paging group, wherein the user terminal processes the next paging frame received on the paging channel to determine whether there is a pageing message intended for the user when the paging indicator has been transmitted on the paging indicator channel; and wherein
the paging message on the paging channel comprises a point-to-multipoint-multicast (PTM-M) group identifier to identify a PTM-M group, and the user terminal comprises a data memory for storing at least one PTM-M identifier allocated to the user.

37. A method for operation of a communication system comprising a network and a plurality of user terminals that are coupled to the network via a communication channel using wireless radio frequency transmission and having a downlink, channel for transmitting messages in the direction from the network to the user terminals, wherein the method comprises:
in a paging channel of the downlink channel, transmitting of pagin messages in paging frames for initiating communication with a user terminal allocated to a paging group of a plurality of said terminals;
in a paging indicator channel of the downlink channel, transmitting of a paging indicator allocated to the paging group, when there is a paging message for a user terminal belonging to the paging group;
processing a next paging frame transmitted on the paging channel by the user terminal to determine whether there is a paging message intended for the user when the paging indicator has been transmitted on the paging indicator channel; and wherein transmitting at least one point-to-multipoint-multicast (PTM-M) group identifier to identify a PTM-M group by the network in the paging message of the paging channel, detecting the at least one PTM-M group identifier by the user terminal in the pagin message on the paging channel, and comparing the detected PTM-M identifier with at least one PTM-M identifier stored in the user terminal.

38. A method according to claim 37, comprising:

next, when the detected PTM-M identifier corresponds to one of the at least one PTM-M identifiers being stored in the user terminal, reading of PTM-M messages belonging to the PTM-M group identified by the PTM-M identifier on a downlink transport channel of the downlink channel.

39. A method according to claim 37, wherein the paging message on the paging channel comprises a PTM-M message intended for the PTM-M group which is identified by means of a PTM-M group identifier.

40. A method according to claim 39, comprising:

in the downlink channel, providing a downlink transport channel shared by user terminals and for transporting PTM-M messages, the user terminal accessing the PTM-M messages of the downlink transport channel when, in the paging channel, the user terminal has detected a PTM-M identifier of a PTM-M group to which the user terminal is allocated.

41. A method according to claim 37, comprising:

allocating an area to at least one cell by the network, wherein the user terminal is in that area, and providing the paging indicator channel and the paging channel comprising the at least one PTM-M identifier to the at least one cell of the area.

42. A method according to claim 37, comprising:

storing of the least one PTM-M identifier allocaed to the user terminal in a data memory of the user terminal.

43. A method according to claim 37, comprising:

in an area serviced by the network and divided into a plurality of cells, entering one of the cells by the mobile user terminal;

restoring the user terminal to be in the cell by the network of the communication system;

providing PTM-M identifiers on the downlink transport channel of the downlink channel, the information indicating the PTM-M groups being supported in the cell by the network; and reading the PTM-M identifiers on the downlink transport channel by the user terminal, and comparing the PTM-M identifiers being read from the downlink transport channel with PTM-M identifiers stored in a memory of the user terminal and indicating the PTM-M groups to which the user terminal is subscribed-in order to determine the PTM-M groups being serviced in the cell for the user terminal.

44. A method according to claim 37, comprising:

periodically detecting and reading the paging indicators on the paging indicator channel by the user terminal.

45. A method according to claim 44, comprising:

next, when a paging indicator is detected on the paging channel, reading of the paging message on the paging channel which is allocated to the paging indicator.

46. A method according to claim 44, wherein the user terminal is in a sleep-mode between, the periodically detecting and reading of the paging indicators.

* * * * *